United States Patent
Ben Michael et al.

(10) Patent No.: US 7,006,517 B1
(45) Date of Patent: Feb. 28, 2006

(54) RESOLVING LINK FRAME COLLISIONS FOR A PHONE LINE NETWORK

(75) Inventors: Simoni Ben Michael, Givat-Zeev (IL); Aviad J. Wertheimer, Zur Hadassa (IL); Simcha Pearl, Kohav Hashahar (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,015

(22) Filed: Mar. 29, 2000

(51) Int. Cl.
*H04L 12/413* (2006.01)

(52) U.S. Cl. ..................... 370/445; 370/458
(58) Field of Classification Search ............... 370/445, 370/447, 448, 394, 231, 235, 242, 244, 245, 370/252, 461, 462, 463, 419, 420, 450, 454, 370/458, 421

See application file for complete search history.

(56) References Cited

U.S. PATENT DOCUMENTS

| | | | | |
|---|---|---|---|---|
| 5,526,355 A | * | 6/1996 | Yang et al. | 370/448 |
| 5,568,469 A | * | 10/1996 | Sherer et al. | 370/448 |
| 5,650,997 A | * | 7/1997 | Yang et al. | 370/448 |
| 5,854,900 A | * | 12/1998 | Kalkunte et al. | 370/448 |
| 6,029,202 A | * | 2/2000 | Frazier et al. | 370/231 |
| 6,078,591 A | * | 6/2000 | Kalkunte et al. | 370/448 |
| 6,130,894 A | * | 10/2000 | Ojard et al. | 370/421 |
| 6,256,317 B1 | * | 7/2001 | Holloway et al. | 370/447 |
| 6,393,457 B1 | * | 5/2002 | Allison et al. | 709/201 |

* cited by examiner

Primary Examiner—Brian Nguyen
(74) Attorney, Agent, or Firm—Blakely, Sokoloff, Taylor & Zafman LLP

(57) ABSTRACT

A PHY for transmitting link frames on a home phone line network without the need of a MAC layer. The PHY transmits an initial link frame if the PHY has not transmitted a frame for a time interval, as specified by the Home Phoneline Networking Alliance. After transmission of the initial link frame, the transmit-clock signal to the MAC is disabled so that the MAC does not request the PHY to transmit a frame. If a collision is detected during transmission of the initial link frame, a counter is set to zero and the PHY transmits back-to-back link frames, where the initial link frame and the back-to-back link frames are each separated by an IPG (Inter Packet Gap). When transmitting these back-to-back link frames, the counter is incremented each time a collision is detected. When the counter equals a specified number, the transmit-clock signal to the MAC is enabled and the PHY waits for a random interval of time before beginning the above-described process again. This process is repeated until a link frame is successfully transmitted without a collision. In this way, higher priority is given to colliding link frames than to colliding data frames, and the case of colliding link frames is efficiently handled by the randomization process so that a live-lock situation is prevented.

12 Claims, 5 Drawing Sheets

FIG. 2
PRIOR ART

RESOLVING LINK FRAME COLLISIONS FOR A PHONE LINE NETWORK

FIELD OF INVENTION

The present invention is directed to network communications, and more specifically, to the transmission of link frames over a home phone line network.

BACKGROUND

The Home Phoneline Networking Alliance (HomePNA) is an incorporated, non-profit association of companies working to bring networking technology to the home. HomePNA envisions bringing Ethernet technology to the home by utilizing existing home phone wiring for the network physical medium. HomePNA provides specifications for the physical layer (PHY), its interface to an Ethernet MAC (Media Access Control), and its interface to the home phone wiring. See the IEEE (Institute of Electrical and Electronic Engineers) 802.3 standard for Ethernet.

The position of a HomePNA PHY in relationship to the OSI (Open Systems Interconnection) model is illustrated in FIG. 1. Logical Link Control (LLC) 102 and MAC 104 are implemented in accordance with IEEE 802.3, and HomePNA PHY 106 communicates with MAC 104 via interface 108. Additional sublayers, and other optional layers, may be added to the layers shown in FIG. 1 so that PHY 106 may provide services to other communication protocols, such as Gigabit Ethernet. In practice, PHY 106 and MAC 104 may be integrated on a single die, so that interface 108 is not readily visible.

PHY 106 receives a MAC frame from MAC 104, strips off the 8 octets of preamble and delimiter from the MAC frame, adds a HomePNA PHY header to form a HomePNA PHY frame, and transmits a PHY frame on physical medium 110. FIG. 2 illustrates HomePNA PHY framing. A PHY frame comprises Ethernet Packet 202, and appended to Ethernet Packet 202 is a HomePNA PHY header, comprising SYNC interval 204, Access ID (Identification) 206, Silence interval 208, and PCOM field 210.

A PHY frame is transmitted on physical medium 110 utilizing pulse position modulation (PPM). All PHY symbols transmitted on physical medium 110 comprise a pulse formed of an integer number of cycles of a square wave that has been filtered with a bandpass filter. The position of the pulse conveys the transmitted symbol. Differential signaling is employed, in which a pulse and its negative are transmitted on two wires for each transmitted symbol.

As indicated in FIG. 2, transmission begins with SYNC symbol 0, and Access ID field 206 is coded into seven AID (Access ID) symbols. SYNC symbol 0 may also be denoted as AID symbol 0. Access ID symbols 1 through 4 are used to identify individual stations to enable reliable collision detection. Access ID symbols 5 and 6 are used to transmit remote control management commands. AID symbol 7 is a silence interval.

SYNC symbol 0 and each AID symbol are 129 tics long, where 1 tic is defined as $(\frac{7}{60})10^{-6}$ seconds, which is approximately 116.667 nanoseconds. AID symbols 1 through 7 begin with a blanking interval of 60 tics, followed by a pulse positioned within one of four time slots to convey two bits of information. The time slots are separated by 20 tics, and are at positions 66, 86, 106, and 126 tics from the beginning of an AID symbol interval. SYNC symbol 0 is composed of a SYNC_START pulse beginning at tic=0 and a SYNC_END pulse beginning at tic=126.

In the example of FIG. 2, AID symbols 1 through 4 represent the Access ID word 00101101, where AID symbol 1 represents AID0=1 and AID1=0, AID symbol 2 represents AID2=1 and AID3=1, AID symbol 3 represents AID4=0 and AID5=1, and AID symbol 4 represents AID6=0 and AID7=0. AID symbols 5 and 6 represent the control word 0001, where AID symbol 5 represents Ctrl0=1 and Ctrl1=0, and AID symbol 7 represents Ctrl2=0 and Ctrl3=0.

A collision is detected only during AID symbols 0 through 7. If a transmitting station reads back an AID value that does not match its own, then a collision is indicated, and a JAM signal is transmitted to alert other stations. Non-transmitting stations may also detect non-conforming AID pulses as collisions. Only a transmitting station emits a JAM signal.

FIG. 3 illustrates in more detail MAC-to-HomePNA PHY interface 108. The signals RxD, RxClk, TxD, TxClk, TxEn, CRS, and COL are described in Table 1. HomePNA PHY 106 retains control of the TxClk and RxClk signals for clocking data synchronously in and out of MAC 104.

TABLE 1

HomePNA PHY-to-MAC Interface Signals.

| MAC Interface Signal | Output From | Function |
| --- | --- | --- |
| RxD | PHY | Data to the MAC is synchronously clocked by RX_CLK |
| RxClk | PHY | Clock for RX_DATA |
| TxD | MAC | Data to the PHY is synchronously clocked by TX_CLK |
| TxClk | PHY | Clock for TX_DATA |
| TxEN | MAC | Transmit enable request from the MAC to begin sending data to the PHY. |
| CRS | PHY | Carrier Sense indicates the PHY is receiving a valid signal from the wiring network |
| COL | PHY | Collision. Indicates a collision was detected by the PHY on the wiring network |

Devices connected to the network have the ability to detect whether they are connected to a "live" network or not by means of a valid link indication function. HomePNA PHY 106 provides a valid link indication via signal Valid Link 302. Valid Link signal 302 may be provided to other layers or a management entity, and indicates whether link 110 is determined by PHY 106 to be functioning.

Each PHY on the network transmits a link frame if it has not transmitted a normal data frame or link frame for 2.0 seconds. The reception of a normal data PHY frame or a link frame causes a valid link indication. Non reception of data or link frames within a time period of not less than 4.0 seconds causes Valid Link signal 302 to indicate an invalid link indication.

Link frames are obtained from link packets by appending a HomePNA header as described in reference to FIG. 2. Link packets are defined by the HomePNA to be either runt packets, null-addressed packets, or self-addressed packets. Runt packets are less than 64 bytes in length. The HomePNA recommends that link packets be implemented as indicated in Table 2.

TABLE 2

Link Packets

| Field | Length | Description |
| --- | --- | --- |
| Option 1: Runt Packet (14 bytes) | | |
| Destination Address | 6 bytes | The Destination address is either a NULL address (all zeros), or the originating station's MAC address. |

TABLE 2-continued

Link Packets

| Field | Length | Description |
|---|---|---|
| Source Address | 6 bytes | The Source address is either a NULL address (all zeroes), or the originating station's MAC address |
| Type/Length | 2 bytes | The type/length field is set to a byte sequence value of 00–01 (hex). This value is an illegal length (not a type) that allows a promiscuous mode sniffer to determine that the runt is a HomePNA link frame. |
| Option 2: Minimum Sized Packet (64 bytes) | | |
| Destination Address | 6 bytes | The Destination address is either a NULL (all zeros), or the originating station's MAC address. |
| Source Address | 6 bytes | The Source address is either a NULL address (all zeroes), or the originating station's MAC address |
| Type/Length | 2 bytes | The Type/Length field is set to a byte sequence value of 00–2E (hex). This is a valid LLC length of 46 bytes. |
| LLC Test PDU Header | 3 bytes | The DSAP field is set to a byte sequence value of 00–00–F3 (hex). This indicates a null-DSAP LLC test request frame. |
| Data | 43 bytes | The data area of the link frame contains the following null terminated string: "HomePNA (version 1.1) Link heartbeat frame" This string allows promiscuous mode sniffers to determine that the frame is a HomePNA link frame. |
| CRC | 4 bytes | Valid MAC CRC |

Usually, the transmission of frames by a PHY requires a MAC layer. But for various market-demand reasons, it is desirable for a PHY to provide valid link indication functionality without assistance from a MAC or higher layer. This allows the use of Ethernet MAC chips that may not have valid link indication functionality built-in, and does not require the need to implement valid link indication functionality in software. The latter is important, not only because implementing valid link indication functionality in software may slow down system performance, but also because there may be power-saving states in which software will not work but for which link indication functionality is still needed. However, the requirement to have MAC functionality incorporated in a PHY is costly and leads to redundancy in devices that also have a MAC layer. It is therefore desirable for a PHY to have valid link indication functionality without the overhead of a MAC layer. There is also a need for a PHY to efficiently handle collisions between a link frame and a data frame, and between a link frame and another link frame. The present invention addresses these issues.

BRIEF DESCRIPTION OF THE DRAWINGS

FIG. 2 illustrates HomePNA PHY framing.

DESCRIPTION OF EMBODIMENTS

Figure 1:
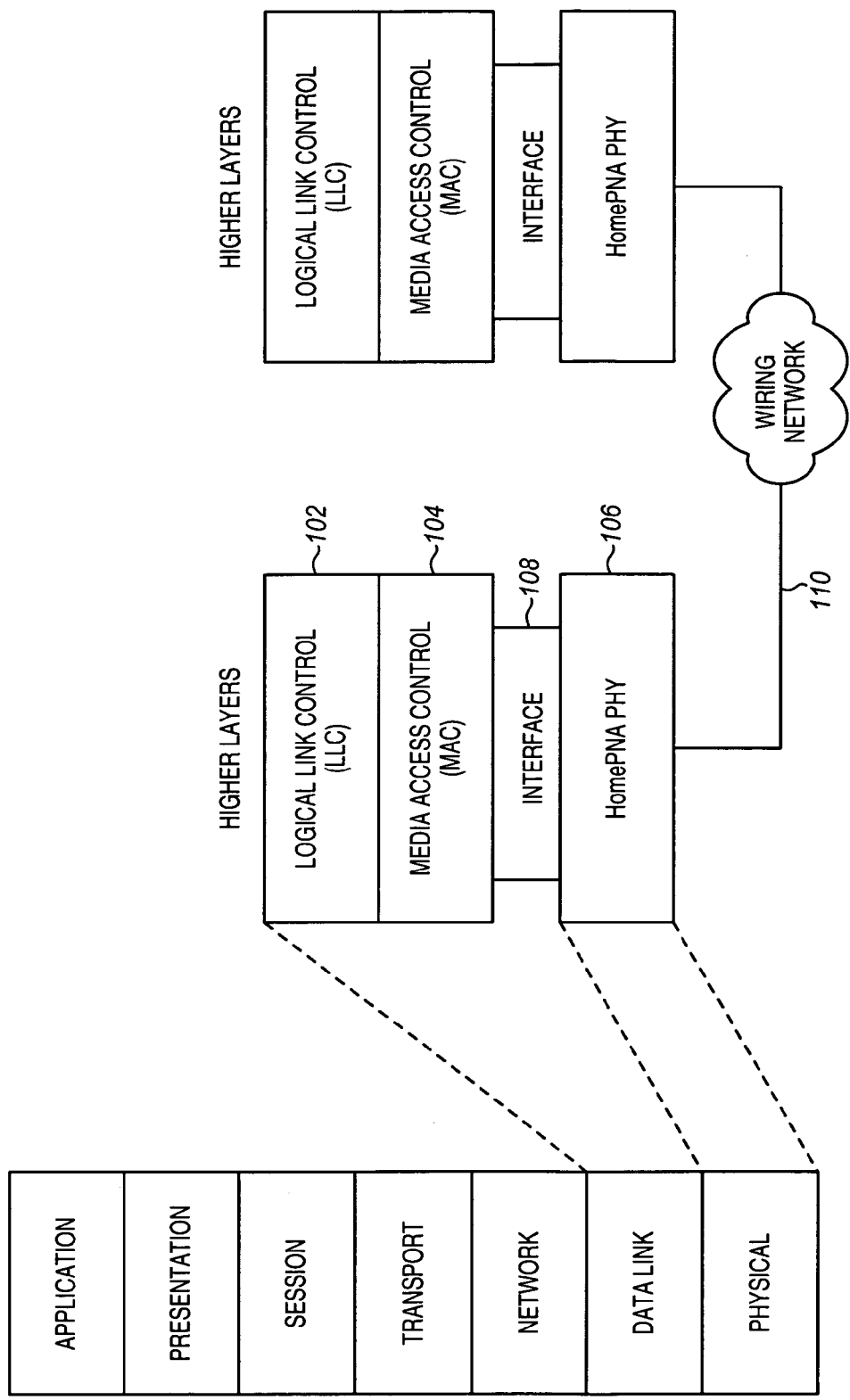
FIG. 1 illustrates the position of a HomePNA PHY within the OSI communication protocol stack.
Figure 3:
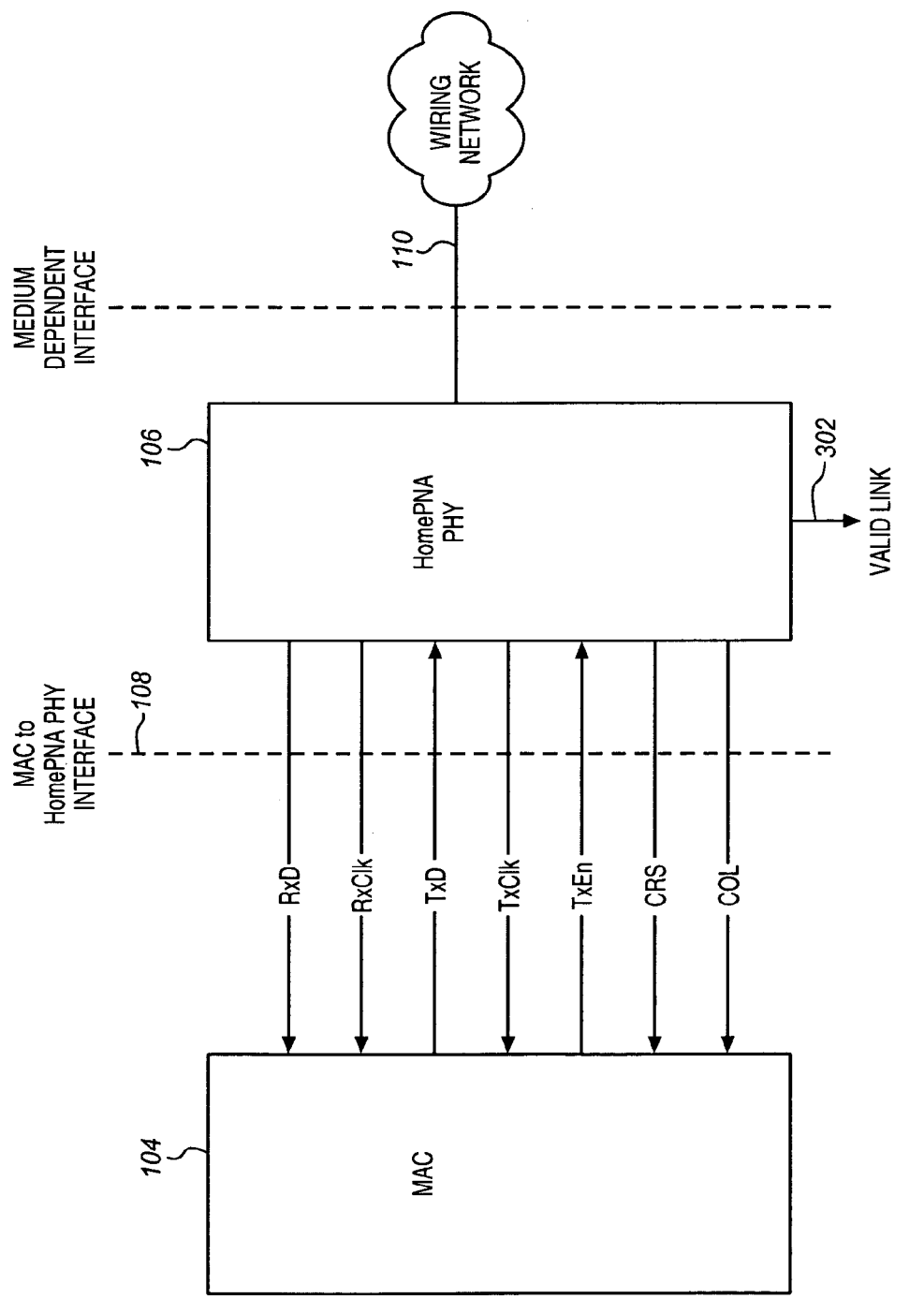
FIG. 3 illustrates a MAC-to-HomePNA PHY interface.
Figure 4:
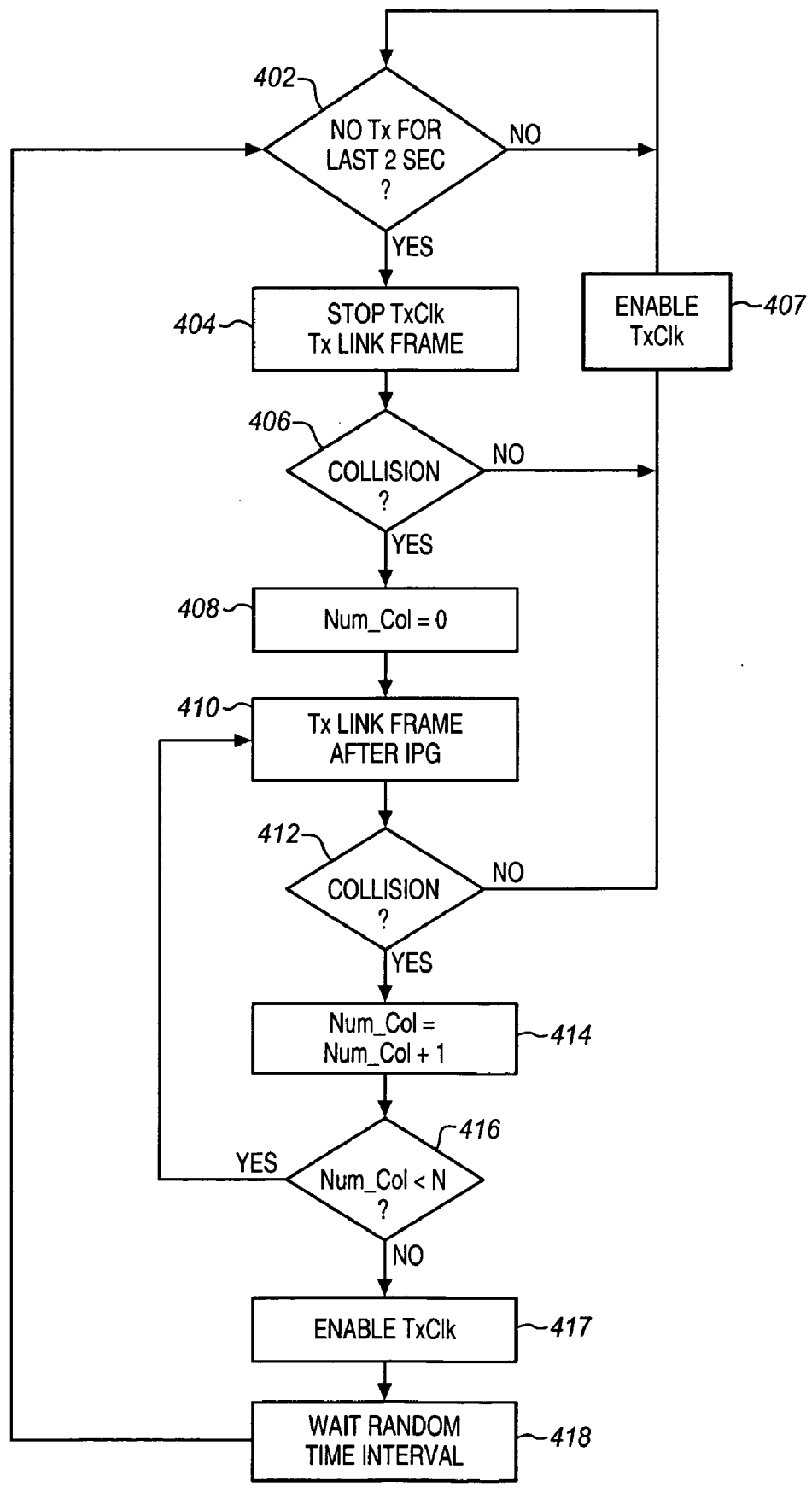
FIG. 4 provides a flow diagram for an embodiment of the present invention.

FIG. 4 diagrams a method implemented by a HomePNA PHY according to an embodiment of the present invention. In FIG. 4, step 402 tests for whether a frame has been transmitted for the last 2.0 seconds. If no transmission has occurred in the last 2.0 seconds, then in step 404 the TxClk signal is stopped so that MAC 104 does not request PHY 106 to transmit a MAC frame, and a link frame is transmitted.

During transmission of the link frame in step 404, step 406 determines whether a collision is detected. If no collision is detected during transmission of the link frame, then the TxClk signal is enabled in step 407 so that MAC 104 is enabled to request transmission of MAC frames, and control is brought back to step 402. If a collision is detected, then a counter for keeping track of the number of collisions, referred to as Num_Col, is set to zero in step 408, and control is brought to step 410.

In step 410 the link frame is re-transmitted after waiting an interval of time equal to IPG, the minimum Inter Packet Gap. Step 412 determines whether a collision is detected during re-transmission of the link frame. If there is no collision, then the TxClk signal is enabled in step 407 and control is brought back to step 402. If there is a collision, control is brought to step 414, whereupon the counter Num_Col is incremented by one.

After Num_Col is incremented by one in step 414, step 416 determines whether it is less than a positive integer N. If Num_Col is less than N, control is brought back to step 410, whereupon the link frame is again re-transmitted after waiting an IPG. If, however, Num_Col is no longer less than N in step 416, then control is brought to step 417 rather than looping back to step 410.

The loop defined by steps 410, 412, 414, and 416 causes a colliding link frame to be re-transmitted, with each re-transmission separated by an IPG, until either a collision-free link frame transmission has been accomplished, or until N re-transmissions have been made. Thus, counting the initial link frame transmission in step 404, when a link frame collides with another frame from another PHY, a sequence of back-to-back link frames, each separated by an IPG, will be transmitted, up to a maximum number of N+1 link frames. The integer N may be distinct for each HomePNA PHY, or may be the same for all HomePNA PHYs.

Once the number of re-transmissions for a colliding link frame has reached N (Num_Col is no longer less than N in step 416), the TxClk signal is enabled in step 417 so that MAC 104 may request PHY 106 to transmit a MAC frame, and a random time interval is allowed to elapse in step 418 before control is brought back to step 402. The randomization provided in step 418 prevents a live-lock condition in which two colliding PHYs are each attempting to transmit a link frame.

Because step 410 re-transmits a colliding link frame after waiting only for an IPG, re-transmission of a colliding link frame is given higher priority than the re-transmission of a colliding data frame governed by the random process used for Ethernet, known as the truncated binary exponential backoff.

Figure 5:
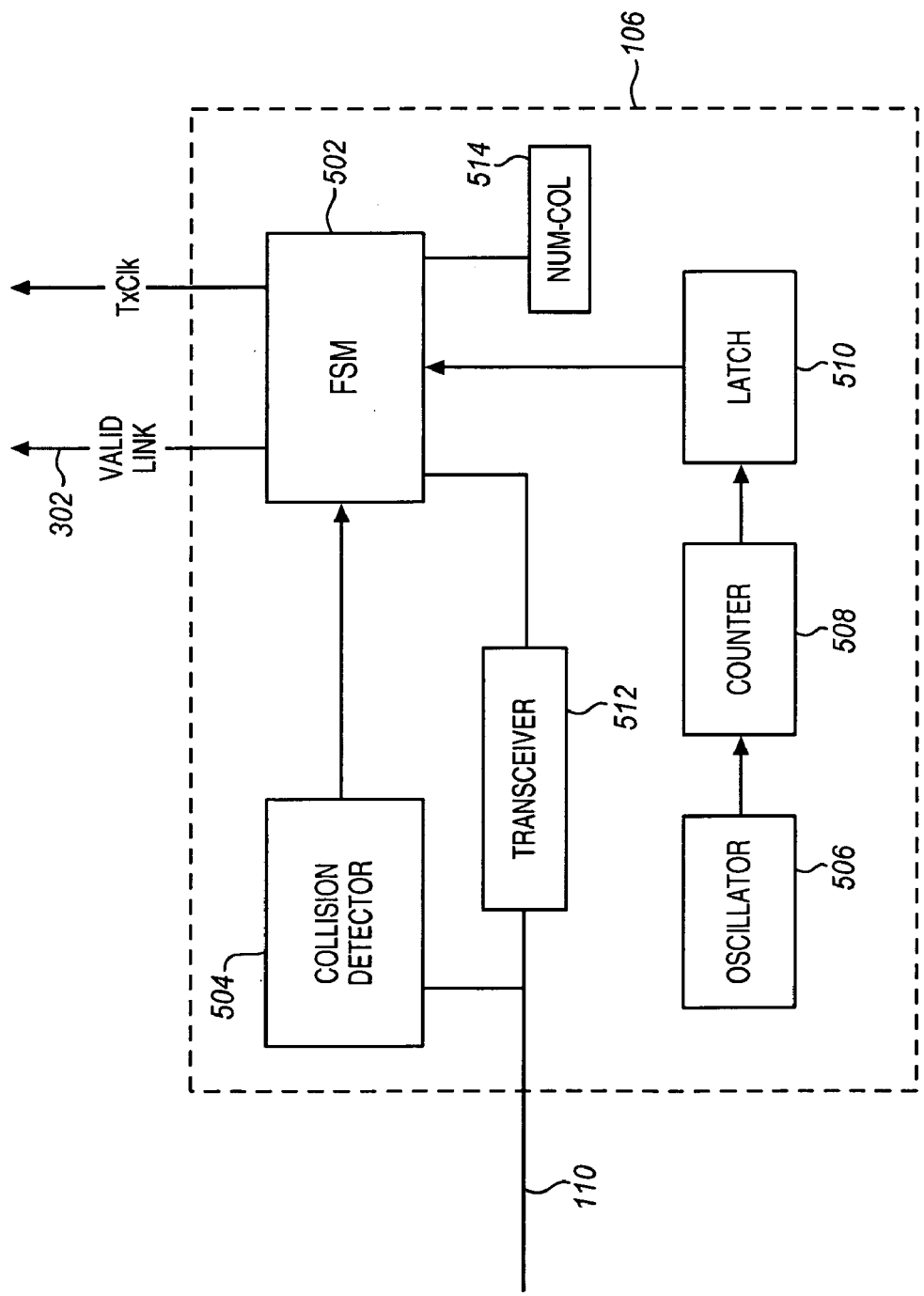
FIG. 5 provides a portion of the PHY architecture for an embodiment of the present invention.

FIG. 5 provides a portion of the PHY architecture for an embodiment of the present invention. Finite state machine (FSM) 502 implements the flow diagram of FIG. 4. For simplicity, only the TxClk signal and Valid Link signal 302 are shown in FIG. 5. Counter 514 stores the value of Num_Col as described in reference to FIG. 4. Collision detector 504 indicates to FSM 502 whether a collision is detected, and FSM 502 indicates to transceiver 512 when a link packet is to be transmitted according to the flow diagram of FIG. 4.

The random time interval generated in step 418 of FIG. 4 may be realized in FIG. 5 by ring oscillator 506, free-running counter 508, and latch 510. Ring oscillator 506 provides a clock signal to free-running counter 508, and is designed so that its frequency, and hence the clock signal used to clock counter 508, is a function of temperature, process, or other environmental factors. Counter 508 is sampled and latched by latch 510 to provide a random number. FSM 502 uses the random number stored in latch 510 to determine the random time interval in step 418.

FSM 502 may be realized by a programmable logic device, or an application specific integrated circuit. FMS 502 may also be realized by a programmable processor responsive to instructions stored as software or firmware. Various modifications may be made to the described embodiments without departing from the scope of the invention as claimed below. For example, another embodiment may follow the flow diagram in FIG. 4, with the exception that if step 416 is answered in the negative, step 417 is not implemented, and after step 418, Num_Col is re-set to zero and control is brought immediately to step 410 rather than to step 402. In another embodiment, a time interval other than IPG may be used in step 410. For example, a positive random variable may be added to IPG before re-transmitting a link frame in step 410, so that a collision among colliding link frames may be more quickly resolved. However, such an approach may not give maximum priority to link frame re-transmission.

What is claimed is:

1. A method used by a device to resolve link frame collision, the method comprising:
   (i) transmitting a link frame from the device if the device has not transmitted a frame in the last x seconds, where x is a positive real number;
   (ii) if a frame collision is detected during step (i), the device transmits a link frame at a time interval after the last link frame transmission of the device has ended;
   (iii) the device repeating step (ii) each time a frame collision is detected until the number of link frame transmission since the occurrence of step (i) equals a specified limit; and
   (iv) if in performing step (iii) the number of link frame transmission since the occurrence of step (i) equals the specified limit, the device performing steps (i) and (ii) upon allowing a random interval of time to elapse after the last link frame transmission of the device has ended.

2. The method as set forth in claim 1, wherein the time interval is an Inter Packet Gap (IPG).

3. A device comprising:
a transceiver for transmitting and receiving frames on a network; and
a finite state machine; wherein
while the finite state machine is in a first state, the device monitors frame transmissions by the transceiver;
while the finite state machine is in a second state, the device transmits link frames such that each link frame is transmitted at a time interval after the last link frame transmission has ended;
while the finite state machine is in a third state, the device does not transmit any link frames, wherein the finite state machine transitions from the third state to the first state after a random time interval upon entering the third state;
the finite state machine transitions from the first state to the second state if there has been no frame transmission for a time period;
the finite state machine causes the transceiver to transmit a link frame when transitioning from the first state to the second state; and
the finite state machine transitions from the second state to the first state if no frame collision is detected since the last link frame transmission.

4. The device as set forth in claim 3, wherein
the finite state machine transitions from the second state to the third state if the number of link frame transmissions since entering the second state is equal to a specified limit.

5. The device as set forth in claim 4, wherein
while the finite state machine is in the first state or the third state, a PHY-to-MAC transmit-clock signal is enabled; and
while the finite state machine is in the second state, the PHY-to-MAC transmit-clock signal is disabled.

6. A device comprising:
a transceiver for transmitting and receiving frames on a network; and
a finite state machine; wherein
while the finite state machine is in a first state, the device monitors frame transmissions by the transceiver;
while the finite state machine is in a second state, the device transmits link frames such that each link frame is transmitted at a time interval after the last link frame transmission has ended, wherein the time interval is an Inter Packet Gap (IPG);
while the finite state machine is in a third state, the device does not transmit any link frames, wherein the finite state machine transitions from the third state to the first state after a random time interval upon entering the third state;
the finite state machine transitions from the first state to the second state if there has been no frame transmission for a time period;
the finite state machine causes the transceiver to transmit a link frame when transitioning from the first state to the second state; and
the finite state machine transitions from the second state to the first state if no frame collision is detected since the last link frame transmission.

7. The device as set forth in claim 6, wherein
the finite state machine transitions from the second state to the third state if the number of link frame transmissions since entering the second state is equal to a specified limit.

8. The device as set forth in claim 7, wherein
while the finite state machine is in the first state or the third state, a PHY-to-MAC transmit-clock signal is enabled; and
while the finite state machine is in the second state, the PHY-to-MAC transmit-clock signal is disabled.

9. A device comprising:
a transceiver for transmitting a first link frame if the device has not transmitted a frame for a time period;
a collision detector, wherein if a first collision is detected by the collision detector during transmitting the first link frame, the device transmits a second link frame at a time interval equal to an Inter Packet Gap (IPG) after transmission of the first link frame;
a free-running counter; and
an oscillator to clock the free-running counter, wherein the free-running counter provides a random time interval so that if a number-of-collisions counter is equal to a specified limit when another frame collision is detected, the random time interval is allowed to elapse before another link frame is to be transmitted.

10. The device as set forth in claim 9, wherein the number-of-collisions counter is changed by an increment if the collision detector detects a second collision when the device transmits the second link frame.

11. A communication system comprising:
a network comprising a home phone line; and
a device coupled to the network to transmit and receive frames, the device comprising:
a transceiver for transmitting a first link frame if the device has not transmitted a frame for a time period;
a collision detector, wherein if a first collision is detected by the collision detector during transmitting the first link frame, the device transmits a second link frame a time interval equal to an Inter Packet Gap (IPG) after transmission of the first link frame;
a free-running counter; and
an oscillator to clock the free-running counter, wherein the free-running counter provides a random time interval so that if a number-of-collisions counter is equal to a specified limit when another frame collision is detected, the random time interval is allowed to elapse before another link frame is to be transmitted.

12. The communication system as set forth in claim 11, wherein the number-of-collisions counter is changed by an increment if the collision detector detects a second collision when the device transmits the second link frame.

* * * * *